Patented Aug. 18, 1925.

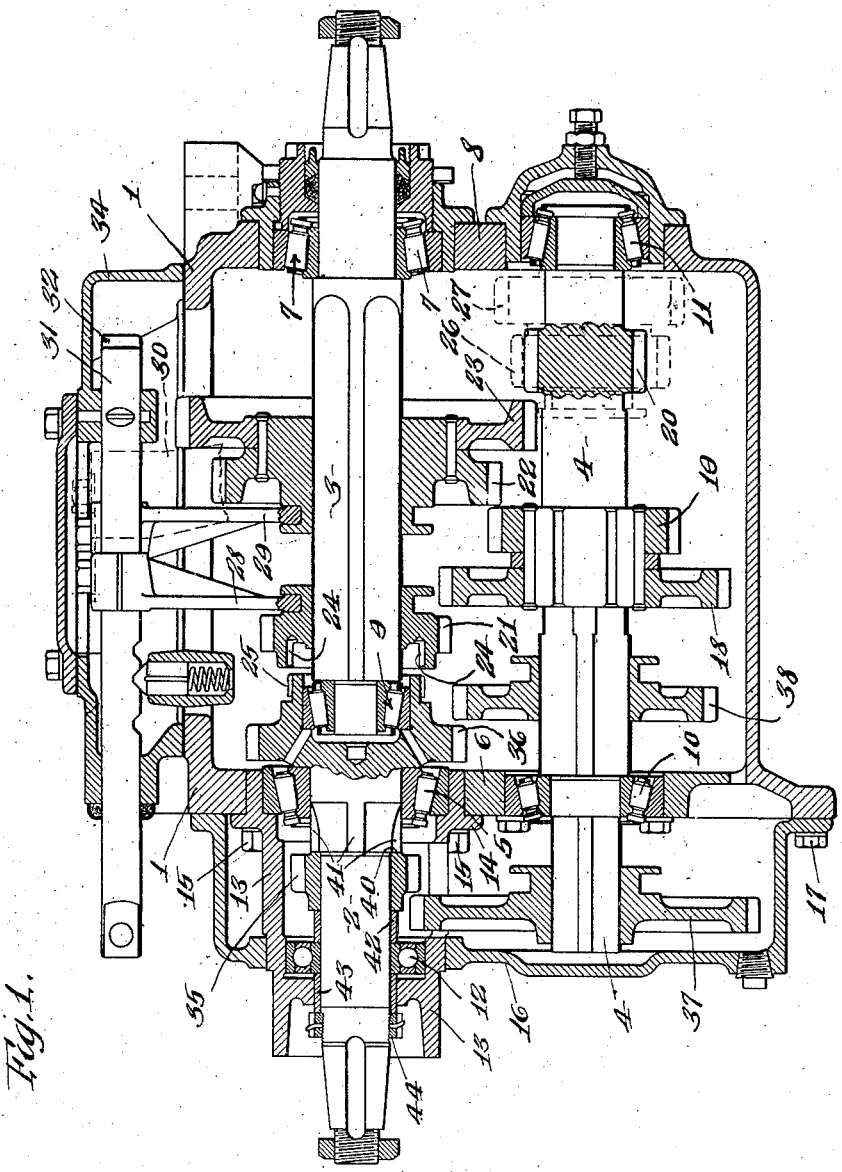

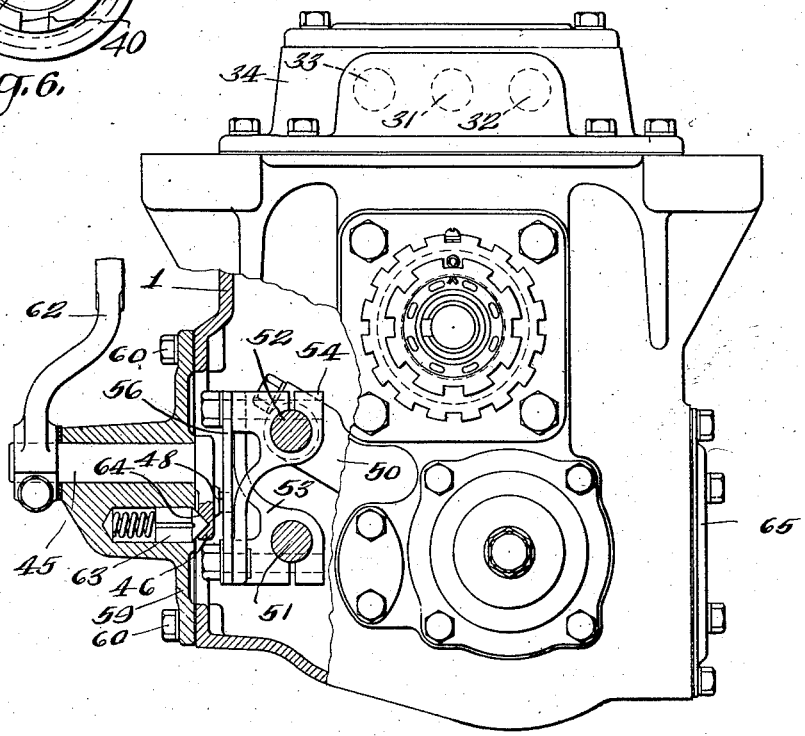

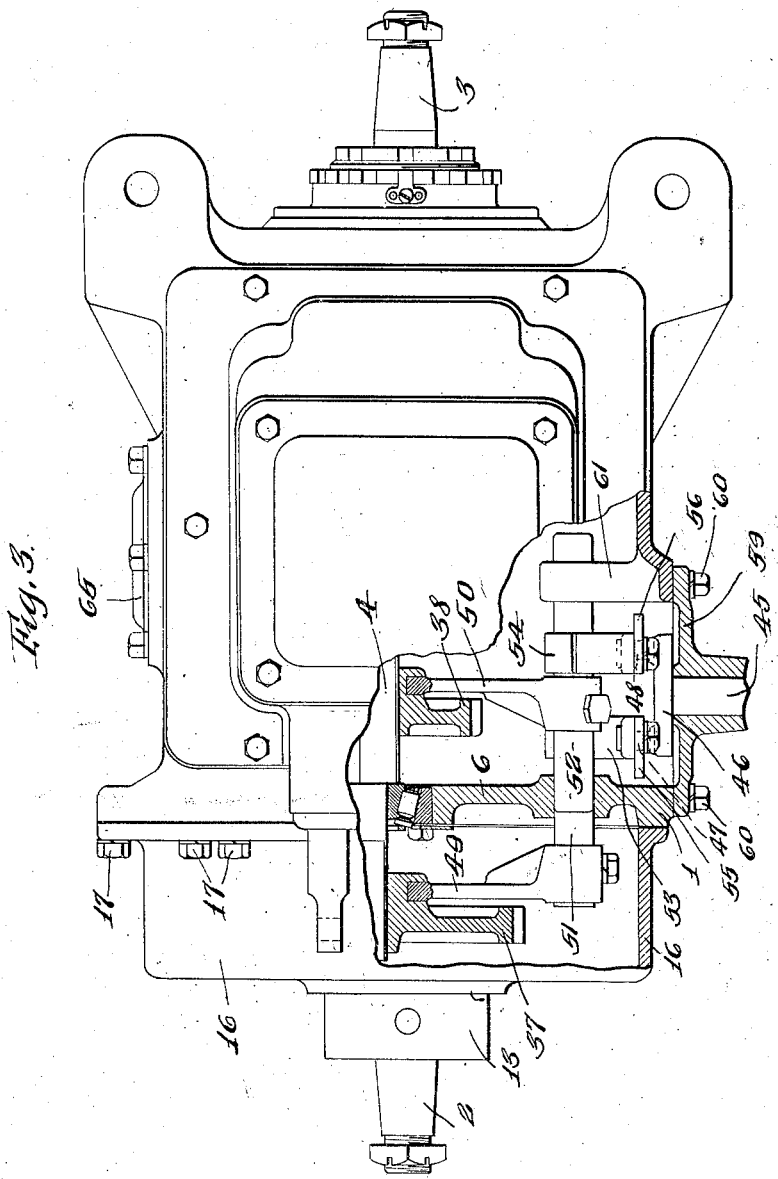

1,550,058

UNITED STATES PATENT OFFICE.

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK.

CHANGE-SPEED GEARING.

Application filed October 23, 1923. Serial No. 670,374.

*To all whom it may concern:*

Be it known that I, GEORGE C. CARHART, a citizen of the United States, residing at Syracuse, in the county of Onondaga and State of New York, have invented a certain new and useful Change-Speed Gearing, of which the following is a specification.

This invention relates to change speed gearing such as used in motor vehicles and has for its object a particularly simple and efficient construction by which the number of speed changes through intermeshing gears of the usual sliding gear transmissions is doubled without substantially changing the construction of such transmission.

The invention consists in the novel features and in the combinations and constructions hereinafter set forth and claimed.

In describing this invention, reference is had to the accompanying drawings in which like characters designate corresponding parts in all the views.

Figure 1 is a vertical sectional view of a gearing embodying my invention.

Figure 2 is a rear elevation partly broken away.

Figure 3 is a plan view partly broken away.

Figures 4 and 5 are detail views of a portion of the shifting mechanism forming part of this invention.

Figure 6 is a detail view of one of the gears on the drive shaft of this gearing.

This change speed gearing comprises generally driving and driven shafts, a counter shaft, the driving and driven shafts being mounted in axial alinement in the main case, the counter shaft being mounted in the main case parallel to the driving and driven shafts, change speed gears, some of which are shiftable between the counter shaft and the driven shaft, change speed gears, some of which are shiftable, between the driving shaft and the counter shaft and means for shifting the shiftable gears.

I have here shown my invention as embodied in a transmission gearing having low speed and two intermediate speeds forward, and reverse through intermeshing gears in addition to direct drive high speed, such invention operating to increase or double the speed changes effected through intermeshing gears, so that the gearing has, in addition to high speed or direct drive, and second, third and low forward, a second range of second, third and low and reverse speeds.

1 designates the main case, which may be of any suitable form, size and construction, it being of the usual construction for sliding gear transmission gearing, used in motor vehicles.

2 is the driving shaft, which is connected to the engine through the usual clutch, 3 is the driven shaft, and 4 the counter shaft, the driving shaft extending at one end into the casing 1 and being journalled near such end in bearings 5 supported in the end wall 6 in the main case.

The driven shaft 3 is journalled in a bearing 7 in the opposite end wall 8 of the main case and extends, at its rear end, outside of the main case, where it is connected to the propeller shaft of the vehicle in any well known manner. The driven shaft, at its inner end, is mounted in a bearing 9 in the inner end of the driving shaft 2. The counter shaft 4 is mounted in bearings 10, 11 in the opposite end walls 6 and 8 of the case and extends, at its front end, outside of the main case parallel to the driving shaft 2.

The driving shaft 2 is journalled, at its outer end, in a bearing 12 carried in a suitable support 13, here shown as tubular, this support 13 being mounted in the opening in the end wall 6 in which the bearing 5 is mounted. In the ordinary gearing this bearing 5 is mounted in a ring or cap through which the driving shaft extends and the support 13 is interchangeable with such cap and is mounted in the wall 6, and the bearing 5 is mounted in the inner end of the support 13. The support 13 is provided with a suitable flange 14, overlying the outer face of the wall of the main case 1, and the support is secured to the main case in any suitable manner as by cap screws 15 extending through the flange 14 and into the wall 6 of the case. The support 13 is additionally braced by a case 16 mounted on the end wall 6 and secured thereto in any suitable manner as by cap screws 17, the case 16 having an opening through which the support 13 extends, such opening fitting the support 13. The case 16 encloses gears on the driving and counter shafts outside of the main case.

The change speed gears between the driven shaft 3 and the counter shaft 4, some of which are shiftable, are of any well known construction and, as here shown, comprise gears 18, 19 and 20 fixed to the counter shaft 4 to rotate therewith and slidable gears 21, 22 and 23 mounted on the driven shaft 3. The gear 21 is formed with a clutch face 24 for coacting with the clutch face 25 on the inner end of the driving shaft 2.

Shifting of the gear 23 to the right into mesh with the gear 20 produces low speed. Shifting of the gear 22 to the left into mesh with the gear 19 produces the next high speed. Shifting of the gear 21 to the right into mesh with the gear 18 produces third speed forward, and shifting of the gear 21 to the left to engage the clutches 24, 25 produces direct drive high speed forward.

Reverse speed is obtained by shifting idler gears 26, 27 indicated in dotted lines, into mesh with the gear 23, when in neutral position, and with the gear 20 respectively. These idler gears 26, 27 are mounted upon a suitable shaft in the case at one side of the counter shaft 4.

The shiftable gears are selected and shifted by any suitable mechanism. That here shown comprises forks 28, 29 and 30, carried by shifting rods 31, 32 and 33, which rods are mounted to slide in suitable guideways in the cover 34 of the main case, and which are connected to a suitable selecting and shifting means as a lever.

35, 36 are gears mounted on the drive shaft 2, inside and outside of the main case. 37, 38 are gears mounted on the counter shaft 4 inside and outside of the main case, the gears 37, 38 being shiftable in and out of mesh respectively with the gears 35 and 36. The gear 36 is usually formed integral with the driving shaft 2. The gear 35 is mounted on the shaft 2 to rotate therewith and is here shown as formed with a cylindrical bore for fitting a cylindrical part of the driving shaft 2, and with an annular flange 39 on its inner side, which flange is formed with notches 40 for receiving splines 41 on the shaft 2. Suitably spaced collars 42, 43 are inserted between the hub of the gear 35 and the bearing 12, and between the bearing 12 and a nut 44 threaded on the shaft against the ring or collar 43.

During high speed, or direct drive, that is, when the clutch faces 24, 25 are engaged both gears 37, 38 are in neutral position, and hence, the counter shaft 4 is idle. During the intermediate and reverse speeds, either the gear 38 is in mesh with the gear 36, or the gear 37 is in mesh with the gear 35. Hence, owing to the gears 37, 38 the number of speed changes (not considering high speed on the direct drive) is doubled.

The gears 37, 38 are shifted by a particularly simple shifting mechanism, which is readily applied to the transmission gearing. This mechanism comprises a reversely movable actuator and motion transmitting means between the actuator and the gears 37, 38, such motion transmitting means being so connected to the actuator that movement of the actuator in one direction from neutral, shifts one gear 37 and the movement of the actuator in the other direction from neutral shifts the other gear 38

The actuator is here shown as a rock shaft 45 suitably supported by the case and carrying the rock arm 46 within the case, which rock arm is provided with a pair of spaced apart pins or followers 47, 48 which are arranged on opposite sides of the axis of the shaft, so that, they move in opposite directions, that is, one pin moves upwardly while the other moves downwardly.

The motion transmitting means comprises shifters, for the gears 37, 38 and cams connected to the shifters and coacting with the pins or followers 47 and 48.

49, 50 designate the shifters for the gears 37, 38 respectively, these shifters being forks coacting with grooves in the hubs of the gear 37, 38, such shifters 49, 50 are here shown as mounted upon endwisely movable rods 51, 52, which rods have brackets 53, 54 carrying the cam plates 55, 56. The cam plates are provided with cam grooves therein for receiving the followers or pins 47, 48. As here shown these cam slots include concentric dwell portions 57 and active portions 58, the dwell portion 57 of each slot being arranged opposite the active portion 58 of the other slot, so that when the actuator 45 rocks in one direction one pin will move in the active portion of one slot, and the other pin will move in the dwell portion of the other slot. Hence, rocking of the actuator 45 in one direction from neutral shifts the gear 37 into mesh with the gear 35, and movement of the actuator 45 in the other direction from neutral shifts the gear 38 into mesh with the gear 36, and while one gear 37 or 38 is being shifted the other remains idle.

The rock shaft 45 is here shown as supported in the cover 59 detachably mounted on the side of the main case 1, and held in position in any suitable manner, as by cap screws 60. The shifter rods 51 slide endwisely in guide openings in the end wall 6 of the main case, and in openings in brackets as 61, provided in the main case 1.

The shaft 45 is provided at its outer end with a suitable lever 62 which is connected to a shifting lever not shown in any suitable manner. The actuator 45 is locked in neutral and in its shifted positions by a lock as a spring pressed poppet 63 carried in a recess in the cover 59 and coacting with sockets 64 found in the outer face of the arm or sector 46.

The counter shaft 4 is here illustrated as off-set or out of the vertical plane of the driving and driven shafts and as arranged opposite a removable plate 65 in the side wall of the casing opposite to that on which the shifting lever 62 is located, this plate 65 being removable for the purpose of attaching power take-off mechanism to the gearing, the off-set counter shaft facilitating the arrangement and applications of the power take-off mechanism. The off-set counter shaft forms no part of this invention.

This transmission gearing is particularly advantageous in that the number of the speed changes outside of direct drive is doubled, by an extremely simple speed changing mechanism applicable to the ordinary change speed transmission gearing.

What I claim is:

1. In a change speed transmission gearing, the combination of a main case, driving and driven shafts, a counter shaft, the driving shaft being mounted at its inner end in a bearing in a wall of the main case, and the driven shaft being mounted in the case in alinement with the driving shaft, the counter shaft being mounted in bearings in the main case, one of which is in said wall, the counter shaft extending through said wall, change speed gears including shiftable gears between the countershaft and the driven shaft, change speed gears including shiftable gears between the driving shaft and the counter shaft, located on opposite sides of said wall, and means for shifting the shiftable gears.

2. In a change speed gearing, the combination of a main case, a driving shaft journalled in a wall of the main case and having a pair of gears thereon located on opposite sides of said wall, a driven shaft journalled in the case in axial alinement with the driving shaft, a counter shaft journalled in bearings in the main case, one of which is located in said wall, the counter shaft extending through said wall, change speed gears between the driven shaft and the counter shaft, a pair of gears on the counter shaft located on opposite sides of said wall, for meshing with the pair of gears on the driving shaft, the members of one of said pairs of gears being shiftable independently of each other into and out of mesh respectively with the members of the other pair of the gears, and means for shifting the same.

3. In a change speed transmission gearing, the combination of a main case, driving and driven shafts, a countershaft, the driving shaft being mounted at its inner end in a bearing in a wall of the main case, the driven shaft being mounted in the main case in alinement with the driving shaft, the countershaft being mounted in bearings in opposite walls of the main case, a support having a bearing for the outer end of the driving shaft, said support being mounted in the opening in the main case for the bearing for the inner end of said driving shaft, change speed gears mounted on the driven shaft and on the countershaft, some of the gears being shiftable, means for shifting the shiftable gears, change speed gears mounted on the driving shaft and the countershaft inside and outside of the main case, some of them being shiftable, and means for shifting the same.

4. In a change speed transmission gearing, the combination of a main case, driving and driven shafts, a countershaft, the driving shaft being mounted at its inner end in a bearing in a wall of the main case, the driven shaft being mounted in the case in alinement with the driving shaft, the countershaft being mounted in bearings in opposite walls of the main case, a support having a bearing for the outer end of the driving shaft, said support being mounted in the opening in the main case, for the bearing for the inner end of said driving shaft, change speed gears mounted on the driven shaft and on the countershaft, some of the gears being shiftable, means for selecting and shifting the shiftable gears, change speed gears mounted on the driving shaft and the countershaft inside and outside of the case, some of them being shiftable, and means for shifting the same, and a case enclosing the gears on the drive and countershafts located outside of the main case, and the second mentioned case being mounted on said support, and secured to the main case.

5. In a change speed gearing, the combination of a main case, driving and driven shafts, a countershaft, the driving shaft being mounted at its inner end in a bearing in a wall of the main case, the driven shaft being mounted in the main case in axial alinement with the driving shaft, the countershaft being mounted in bearings in the opposite wall of the main case, and extending outside of the main case parallel to the driving shaft, change speed gears mounted within the main case on the driven shaft and the countershaft, some of said gears being shiftable, means for shifting the shiftable gears, change speed gears mounted on the driving shaft and the countershaft inside and outside of the main case, some of said gears being shiftable, and means for shifting the same.

6. In a change speed gearing, the combination of a main case, driving and driven shafts, a countershaft, the driving shaft being mounted at its inner end in a gearing in a wall of the main case, the driven shaft being mounted in the main case in axial alinement with the driving shaft, the countershaft being mounted in bearings in the opposite wall of the main case, and extending outside of the main case parallel to the driving shaft, a tubular support secured at its inner end to the main case and having a bearing for the outer end of the driving shaft, said support being mounted in the opening in the main case for the bearing for the inner end of said driving shaft, change speed gears mounted on the driven shaft and the countershaft, some of said gears being shiftable, means for shifting the shiftable gears, change speed gears mounted on the driving shaft and the countershaft inside and outside of the main case, some of said gears being shiftable, and means for shifting the same.

7. In a change speed gearing, the combination of a main case, driving and driven shafts, a countershaft, the driving shaft being mounted at its inner end in a bearing in a wall of the main case, the driven shaft being mounted in the main case in axial alinement with the driving shaft, the countershaft being mounted in bearings in the opposite wall of the main case, and extending outside of the main case parallel to the driving shaft, a tubular support having a bearing for the outer end of the driving shaft, said support being mounted in the opening in the main case for the gearing for the inner end of said driving shaft and being secured at its inner end to the main case, change speed gears mounted on the driven shaft and the countershaft, some of said gears being shiftable, means for shifting the shiftable gears, change speed gears mounted on the driving shaft and the countershaft inside and outside of the main case, some of said gears being shiftable, and means for shifting the same, and a case enclosing the gears on the driving and countershafts outside of the main case, the second case being mounted on the outside of the main case and on said tubular support.

8. In a change speed gearing, the combination of a main case, driving and driven shafts, a countershaft, the driving shaft being mounted at its inner end in a bearing in a wall of the main case, the driven shaft being mounted in the main case in axial alinement with the driving shaft, the countershaft being mounted in bearings in the opposite wall of the main case, and extending outside of the main case parallel to the driving shaft, a support having a bearing for the outer end of the driving shaft, said support being secured to the main case, change speed gears mounted on the driven shaft and the countershaft, some of said gears being shiftable, means for shifting the shiftable gears, change speed gears mounted on the driving shaft and the countershaft inside and outside of the main case, some of the latter gears being shiftable, and means for shifting the same, and a case mounted on said support and enclosing the gears on the outer ends of the countershaft of said support, the last mentioned case being secured to the main case.

9. In a change speed gearing, the combination of a main case, having an opening at one side, driving and driven shafts, a countershaft, the driving shaft being mounted at its inner end in a bearing in a wall of the main case, the driven shaft being mounted in the main case in axial alinement with the driving shaft, the countershaft being mounted in bearings in opposite walls of the main case, change speed gears, some of which are shiftable between the countershaft and the driven shaft, change speed gears, some of which are shiftable between the driving and the countershafts, a cover for such opening in the main case, and an actuator for shifting the last mentioned shiftable gears, said actuator being carried by said cover.

10. In a change speed gearing, the combination of a main case, having an opening at one side, driving and driven shafts, a countershaft, the driving shaft being mounted at its inner end in a bearing in a wall of the main case, the driven shaft being mounted in the main case in axial alinement with the driving shaft, the countershaft being mounted in bearings in opposite walls of the main case, change speed gears, some of which are shiftable between the countershaft and the driven shaft, change speed gears, some of which are shiftable between the driving and the countershafts, a cover for said opening in the main case, and means for shifting the last mentioned shiftable gears, comprising a rocking actuator carried by said cover, and connections between the actuator and said shiftable gears.

11. In a change speed gearing, the combination of a main case, having an opening at one side, driving and driven shafts, a countershaft, the driving shaft being mounted at its inner end in a bearing in a wall of the main case, the driven shaft being mounted in the main case in axial alinement with the driving shaft, the countershaft being mounted in bearings in opposite walls of the main case, change speed gears, some of which are shiftable between the countershaft and the driven shaft, change speed gears, some of which are shiftable between the driving and the countershafts, a cover for said opening in the main case, and means for shifting the last mentioned shiftable gears, comprising a rocking actuator carried by said cover, and connections between the actuator and said shiftable gears, said connections including shifter rods within the case and connected respectively to the shiftable gears, and cam means coacting with the actuator for shifting the rods.

12. In a change speed transmission gearing, the combination of a driving shaft having a pair of gears thereon, a second shaft having a pair of gears, the gears of one pair being shiftable independently of each other into and out of mesh with the gears of the other pair respectively, means for shifting the shiftable gears, comprising a reversely movable actuator, motion transmitting cams connected respectively to the shiftable gears, the cams being movable independently of each other, and having active and dwell portions, and the actuator having a follower co-acting with the active and dwell portions of the cams, the dwell portion of each cam being arranged to coact with the companion follower when the active portion of the other cam is coacting with its companion follower.

13. In a change speed transmission gearing, the combination of a driving shaft having a pair of gears thereon, a second shaft having a pair of gears, the gears of one pair being shiftable independently of each other into and out of mesh with the gears of the other pair respectively, means for shifting the shiftable gears, comprising a reversely movable actuator, shifter rods connected respectively to the shiftable gears, said rods being provided with cams, each having an active and a dwell portion, the actuator comprising a rock shaft having a rock arm provided with followers coacting respectively with the cams, the dwell portion of each cam being arranged to coact with the companion follower when the active portion of the other cam is coacting with its companion.

In testimony whereof, I have hereunto signed my name, at Syracuse, in the county of Onondaga, and State of New York this 15th day of October, 1923.

GEORGE C. CARHART.